(12) United States Patent
Shwartsman et al.

(10) Patent No.: US 8,990,512 B2
(45) Date of Patent: Mar. 24, 2015

(54) METHOD AND APPARATUS FOR ERROR CORRECTION IN A CACHE

(71) Applicant: Intel Corporation, Santa Clara, CA (US)

(72) Inventors: Stanislav Shwartsman, Haifa (IL); Raanan Sade, Kibutz Gvat (IL); Larisa Novakovsky, Haifa (IL); Arijit Biswas, Holden, MA (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 13/664,682

(22) Filed: Oct. 31, 2012

(65) Prior Publication Data

US 2014/0122811 A1 May 1, 2014

(51) Int. Cl.
*G06F 12/00* (2006.01)
(52) U.S. Cl.
USPC ............................ 711/144; 711/129; 711/156
(58) Field of Classification Search
USPC .......................................... 711/129, 144, 156
See application file for complete search history.

(56) References Cited

U.S. PATENT DOCUMENTS

| | | | |
|---|---|---|---|
| 2005/0154838 A1* | 7/2005 | DeWitt et al. ................. | 711/144 |
| 2012/0331232 A1* | 12/2012 | Eichenberger et al. ....... | 711/130 |
| 2014/0089602 A1* | 3/2014 | Biswas et al. ................. | 711/144 |
| 2014/0189251 A1* | 7/2014 | Steely et al. .................. | 711/141 |

OTHER PUBLICATIONS

U.S. Appl. No. 11/827,197, filed Jul. 11, 2007, entitled "Protecting Tag Information in a Multi-Level Cache Hierarchy" by Herbert Hum, et al.

* cited by examiner

*Primary Examiner* — John Lane
(74) *Attorney, Agent, or Firm* — Trop, Pruner & Hu, P.C.

(57) ABSTRACT

A processor includes a core to execute instructions and a cache memory coupled to the core and having a plurality of entries. Each entry of the cache memory may include a data storage including a plurality of data storage portions, each data storage portion to store a corresponding data portion. Each entry may also include a metadata storage to store a plurality of portion modification indicators, each portion modification indicator corresponding to one of the data storage portions. Each portion modification indicator is to indicate whether the data portion stored in the corresponding data storage portion has been modified, independently of cache coherency state information of the entry. Other embodiments are described as claimed.

24 Claims, 10 Drawing Sheets

METHOD AND APPARATUS FOR ERROR CORRECTION IN A CACHE

BACKGROUND

Single bit errors in a semiconductor memory may arise from random energetic particles, such as neutrons or alpha particles, passing through the memory. Error detection techniques, such as parity, may be used to detect such errors. Error correction techniques may be employed to correct errors.

In one error correction technique that can be employed when a parity error is detected indicating that stored data in a cache line is erroneous, the cache line is flushed and is overwritten by a copy of the data originally stored at the cache line. However, this technique may be inapplicable when data in the cache line has been modified, which can lead to a machine check error or other undesirable behavior.

DETAILED DESCRIPTION

In various embodiments, methods and apparatus are provided to correct data stored in a cache line of a cache memory including modified data when an error has been detected within the cache line. In one embodiment, a method to perform such error correction includes identifying a modified portion of the cache line that is not causing the error, partially evicting the cache line (e.g., evicting only the modified portion) to a memory block of a memory. The memory block is to store data that was originally stored in the cache line and the evicted modified portion is to replace a portion of the data in the memory block. The method includes, after replacement of the portion of the data in the memory block by the modified portion, obtaining contents of the memory block for storage back in the cache line.

Figure 1:
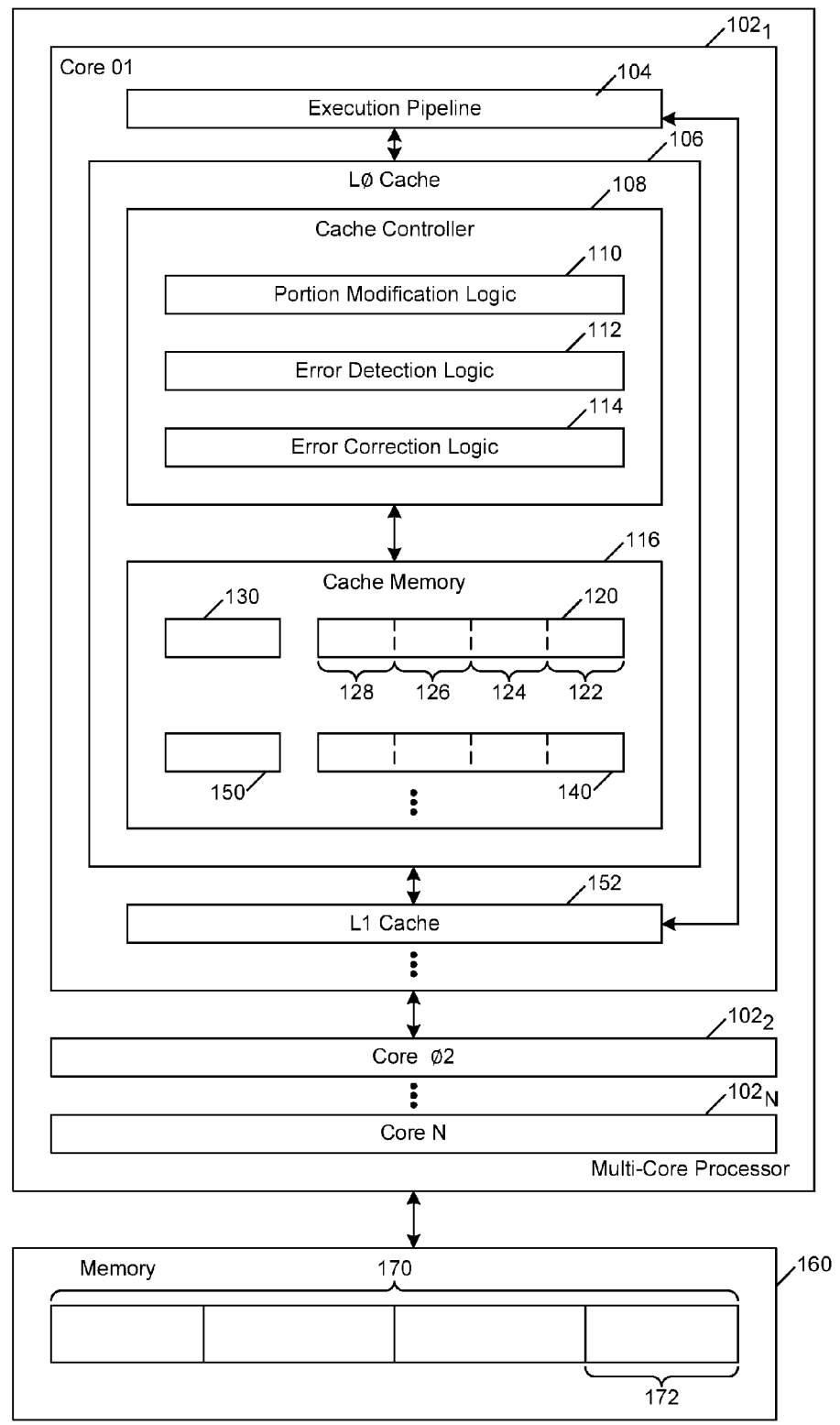
FIG. 1 is a block diagram of a processor in accordance with an embodiment of the present invention.

Referring now to FIG. 1, shown is a block diagram of a processor in accordance with an embodiment of the present invention. Processor 100 may be a multicore processor having a first core $102_1$, a second core $102_2$, and optionally, additional cores to $102_N$. The first core $102_1$ may include an execution pipeline 104, an L0 cache memory 106, and optionally an L1 cache memory 152 and other optional cache memories (not shown in FIG. 1). The L0 cache memory 106 may include a cache controller 108 and a cache memory 116. The cache controller 108 may include portion modification logic 110, error detection logic 112, and error correction logic 114. The cache memory 116 may include a plurality of entries, each entry including a corresponding cache line data storage (also "cache line" or "data storage" herein), e.g., cache lines 120 and 140, each cache line having corresponding cache line metadata (also "metadata" herein) 130, and 150, respectively. Each cache line may include a plurality of data storage portions. For example, the cache line 120 may include data storage portions 122, 124, 126, and 128. Each data storage portion may store a corresponding data portion. In the embodiment of FIG. 1, each cache line includes four data storage portions, e.g., each data storage portion to store 16 bytes. In some embodiments, each cache line may include more than four data storage portions or less than four data storage portions. And of course the data storage portions may be of various sizes in different embodiments.

Metadata 130 associated with the cache line 120 may include portion modification indicator bits that may indicate which of the data storage portions of the cache line 120 stores a data portion that has been modified from a data portion previously stored in the data storage portion. For example, the portion modification indicator bits may include one bit for each data storage portion 122, 124, 126, 128 of the cache line 120. The metadata 130 may also include cache coherence information indicating that data stored in the cache line 120 is one of a Modified (M), Exclusive (E), Shared (S), or Invalid (I) state, according to a cache coherency protocol. Stored metadata corresponding to each cache line of the cache memory 114 will be discussed in greater detail with respect to FIG. 2.

In operation, the portion modification logic 110 may determine, from portion modification indicator bits in the metadata 130 of the corresponding cache line 120, that a first data storage portion 122 of the cache line 120 stores modified data. The error detection logic 112 may detect an error associated with the cache line 120, and the error detection logic 112 may determine that the error is caused by a data error in a data storage portion other than the first data storage portion 122. The metadata 130 may include parity bits that may indicate which data storage portion stores erroneous data that is reflected in the error detected. The error correction logic 114 may correct the error in the cache line 120 based on establishing that the first data storage portion 122 stores modified data that is free of data errors (e.g., correct).

For example, the error correction logic 114 may partially evict the modified data stored in the first data storage portion 122 to a memory 160 or to another location of a memory hierarchy such as L1 cache 152. In an embodiment the memory 160 may be a portion of a system memory such as a dynamic random access memory (DRAM). The error correction logic 114 may write the modified data portion into a first data storage portion 172 of a memory block 170 within the memory 160. The memory block 170 may include other data (e.g., data initially stored in the cache line 120) that was previously stored in the cache line 120 prior to detecting the error in the cache line 120.

In an embodiment, the first data portion may be written into the memory block 170 by overwriting a data portion that was previously stored in the first data storage portion 172 of the memory block 170. The memory block 170 then stores the (correct) modified data in the first data storage portion 172 of the memory block 170, and also keeps correct data previously stored in other portions of the cache line 120. The error correction logic 114 may read data currently stored in the data block 170 and may store, in the cache line 120, the data read from the data block 170. By storing the data read from the memory block 170 into the cache line 120, the erroneous portion of data in the cache line 120 is replaced by correct data, and hence the data being stored in the cache line 120 is correct. In other embodiments, one or more additional cache memories, e.g., cache memory 152, may include the same logic as described with respect to the cache 106 and corresponding metadata associated with each cache line of the additional cache memory, the metadata including parity bits to indicate which data storage portion of a cache line stores erroneous data, and portion modification indicators indicating which portion of the cache line is modified from data originally stored in that portion of the cache line.

Figure 2:
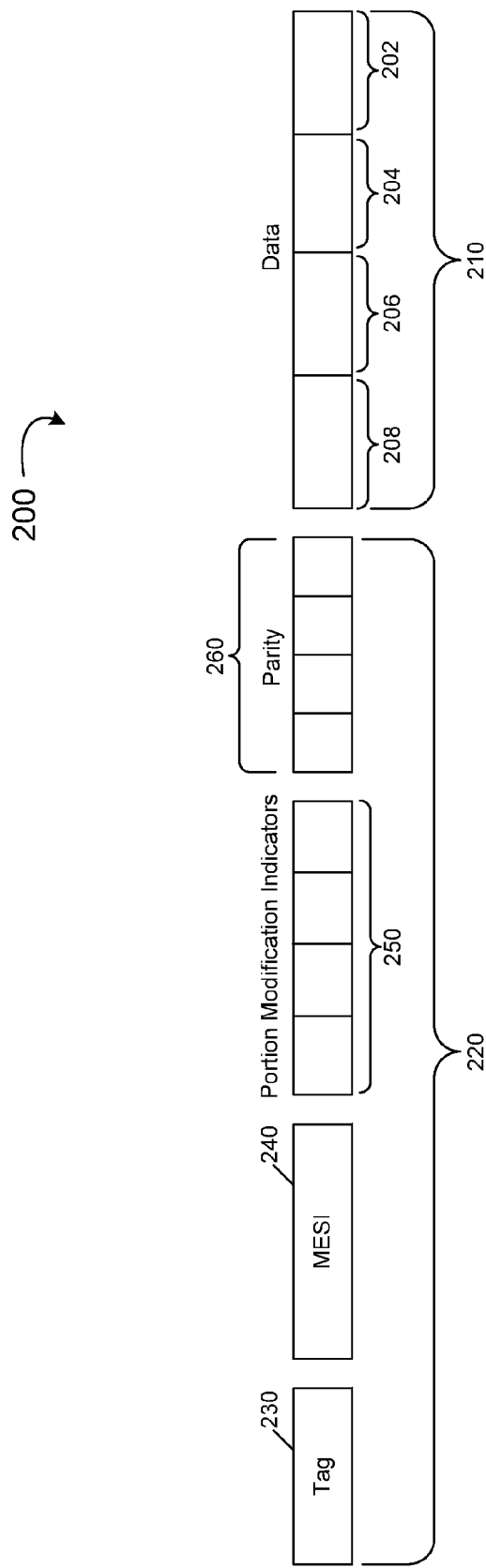
FIG. 2 is a diagram depicting data and metadata stored in a cache line of a cache memory of a processor, in accordance with an embodiment of the present invention.

Referring now to FIG. 2, shown is a diagram of a cache line entry 200 and associated metadata of the cache memory 116 in accordance with another embodiment of the present invention. The cache line entry 200 includes data storage 210 and metadata storage 220 that includes an address tag field 230, cache coherence field to store (MESI) or other cache coherency state indicators 240, a portion modification indicator field to store portion modification indicators 250, and a parity field to store parity bits 260.

The data storage 210 is to store data. The address tag field 230 is to store address information that may be used by the cache controller 106 to locate the cache line entry 200. The cache coherence field 240 is to provide an indication of a cache coherence state, e.g., Modified, Exclusive, Shared, or Invalid, of the stored data in the data storage 210. The portion modification indicators 250 are to indicate, for each data storage portion 202, 204, 206, 208 of the data storage 210, whether the data storage portion is modified from data originally stored. For example, the portion modification field may indicate that a first data storage portion 202 stores modified data and that each other data storage portion 204, 206, 208 stores a corresponding data portion that has not been modified from a data portion initially stored, e.g., logic: 1 for modified portion and logic: 0 for unmodified portion. The parity field is to indicate whether a data storage portion of the data storage 210 stores erroneous data. In some embodiments, the parity field is to provide parity information for each data storage portion of the other embodiments, granularity of the parity bits may be smaller, e.g., 1 parity bit for each byte of data in a cache line with 64 bytes of data storage.

Figure 3:
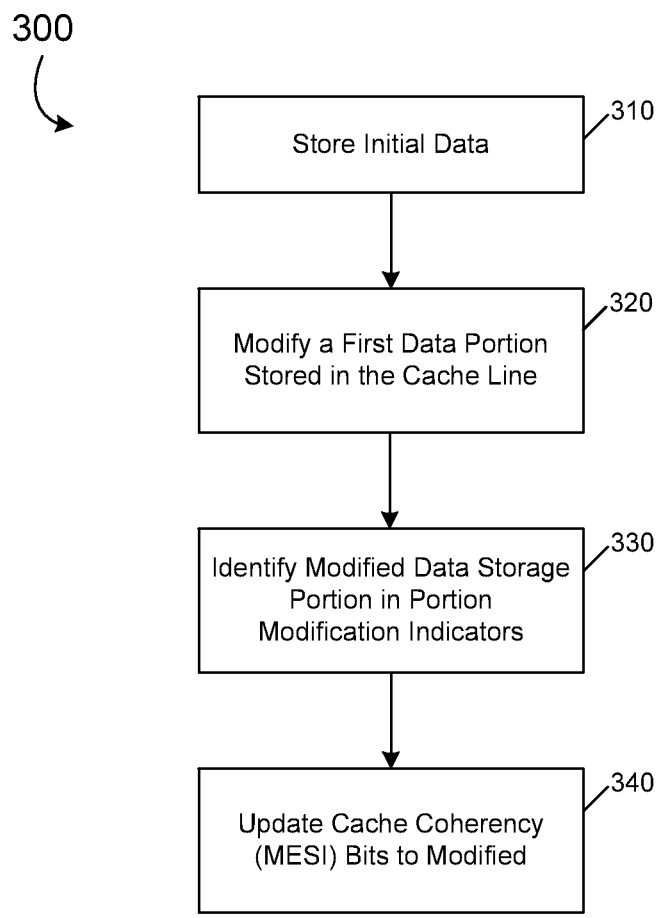
FIG. 3 is a flow diagram of a method for identifying a modified data portion of a cache line in accordance with an embodiment of the present invention.

Referring now to FIG. 3, shown is a method 300 for indicating a modified portion of a cache line entry in accordance with an embodiment of the invention. In an embodiment, the method 300 can be performed by a cache controller, such as the cache controller 108 of FIG. 1.

The method 300 may begin by storing initial data in a cache line (block 310). For example, data storage portion of the cache line may have a length of 64 bytes, which may include four data storage portions of 16 bytes, each data storage portion to store a corresponding data portion. Next at block 320, a first data portion stored in a corresponding data storage portion of the cache line is modified. For example, a first modified data portion may replace a first data portion stored in a first data storage portion of the cache line. Next, at block 330, a modified data storage portion storing the first modified data portion may be identified in portion modification indicator bits of a metadata portion of the cache line (e.g., each data storage portion of the cache line having a corresponding modification bit), such as the portion modification indicator bits 250 of FIG. 2. At block 340, a cache coherency state associated with the cache line may be updated to Modified to indicate that data stored in the cache line has been modified.

The method of FIG. 3 can be performed by hardware, software, firmware, or combinations thereof. While shown at a high level in the embodiment of FIG. 3, it is to be understood that the scope of the present invention is not so limited. Also other methods of correcting data are possible, such as obtaining original data from memory and merging the original data into the cache.

Figure 4:
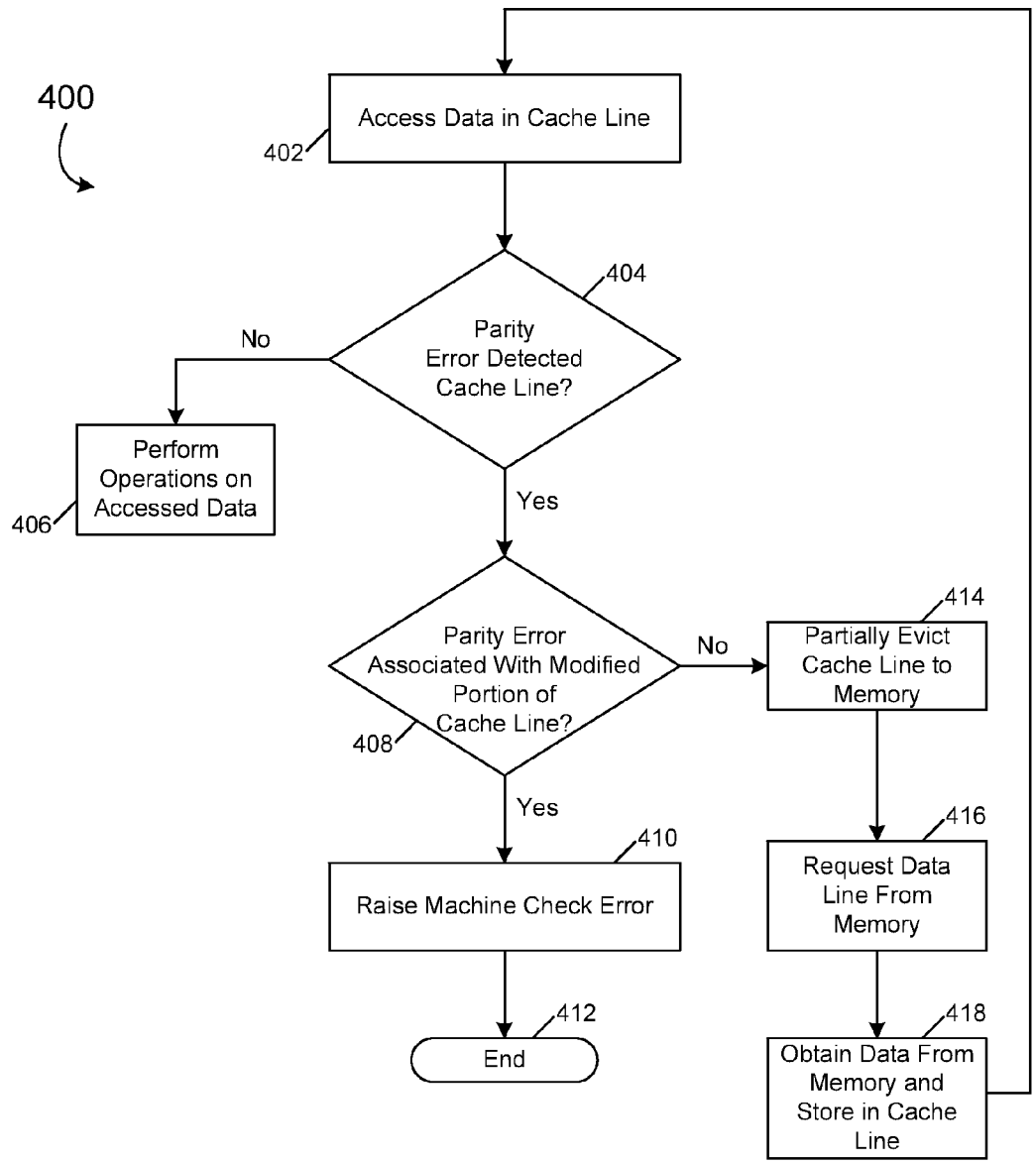
FIG. 4 is a flow diagram of a method for correcting a cache line in accordance with an embodiment of the present invention.

Referring now to FIG. 4, shown is a method 400 for correcting a data error in a cache line, such as a cache line that includes at least one modified data portion that has been identified. In an embodiment, the method 400 can be performed by a cache controller, such as the cache controller 108 of FIG. 1.

Beginning with block 402, data in a cache line is accessed. Next, control passes to diamond 404, where it can be determined whether a parity error associated with the cache line is detected. If no parity error is detected, operations are performed on the accessed data (block 406). If a parity error is detected that is associated with the cache line, control passes to diamond 408, where it can be determined whether the parity error is associated with a modified portion of the cache line, in order to possibly correct for the parity error. If the parity error is associated with the modified portion of the cache line, control passes to block 410 where a machine check error is raised, and the method ends at block 412.

If, at diamond 408, it is determined that the parity error is not associated with the modified portion of the cache line, control passes to block 414, where the cache line can be partially evicted to a memory, such as the memory 160 of FIG. 1. For example, the modified portion can be written to a portion of a data block storing data that was initially stored in the cache line. In an example, the data block may be located in a higher level cache, or in a system memory.

Control then passes to block 416, where the data stored in the data block of the memory can be requested. Control passes to block 418, where the data can be obtained from the data block of the memory and can be stored in the cache line of the cache memory to correct the error in the data stored in the cache line. Control passes back to block 402, where data may be accessed in the cache line. The method 400 may be repeated.

The method of FIG. 4 can be performed by hardware, software, firmware, or combinations thereof. While shown at a high level in the embodiment of FIG. 4, it is to be understood that the scope of the present invention is not so limited.

Figure 5:
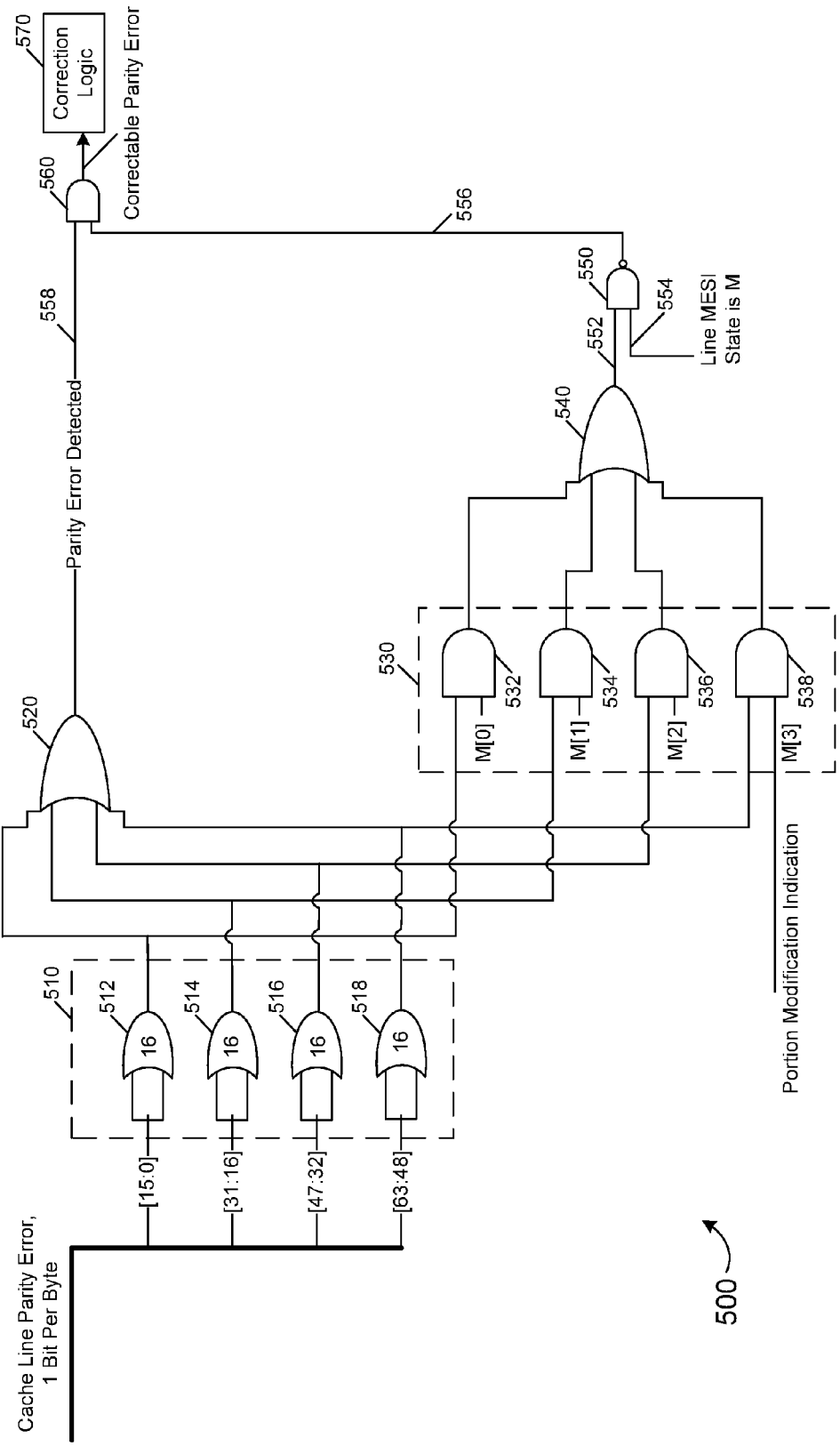
FIG. 5 is a diagram of logic in accordance with an embodiment of the present invention.

Referring now to FIG. 5, shown is a block diagram of detection logic to detect whether a parity error associated with a cache line is correctable. In an embodiment, this logic 500 may be present in a cache controller of a cache memory. A plurality of OR gates (512, 514, 516, 518, in block 510) coupled to a cache line parity detector (not shown in FIG. 5) can indicate which data storage portion of a cache line is associated with a parity error detected with respect to the cache line. In the embodiment shown, for a data storage of 64 bytes in length, each of the OR gates 512, 514, 516, 518 may be associated with a distinct 16 byte portion of the data storage. In other embodiments, more OR gates may be used, each associated with a corresponding data storage portion having a smaller size. For example, in an embodiment having 8 OR gates for a data storage of 64 bytes, each OR gate may be associated with a corresponding data storage portion of 8 bytes, for a total of 8 data storage portions in the data storage of the cache line.

In an embodiment, an OR gate having an output of 1 may indicate a parity error associated with data stored in the corresponding data storage portion (e.g., the data stored in the corresponding data storage portion is erroneous), and the OR gate having an output of 0 may indicate no parity error associated with the data stored in the corresponding data storage portion, e.g., the data stored in the corresponding data storage portion is correct.

The output of each of the OR gates in the block 510 is input to an OR gate 520 and to a corresponding first input of a corresponding AND gate (532, 534, 536, 538, in block 530). A second input of each of the AND gates in the block 530 is to receive an indication of whether a data portion stored a corresponding data storage portion has been modified from initially stored data, based on a value of a corresponding portion modification indicator that may be stored, e.g., in metadata storage of the cache line. The output of each of the AND gates in the block 530 is input to an OR gate 540. The output 552 of the OR gate 540 is to indicate whether a modified portion includes erroneous data, and the output 552 can be input to a first input of a NAND gate 550. A second input 554 of the NAND gate 550 is to receive an indication of whether the cache line is in a modified cache coherency state (M). The NAND gate 550 is to output a value to indicate whether a parity error is detected in a modified data storage portion of a modified cache line, which value is to be input to a first input 556 of an AND gate 560. A second input 558 of the AND gate 560 is to receive an output value from the OR gate 520 to indicate whether a parity error has been detected with respect to the cache line. The AND gate 560 is to output an indication of whether a correctable parity error has been detected. The output of the AND gate 560 may be input to correction logic 570 to correct erroneous data in the cache line. For example, the correction logic 570, on receiving the indication that a correctable parity error has been detected, may evict the modified data portion of the cache line to a memory block storing correct data that was initially stored in the cache line. The memory block may be situated in e.g., a system memory or a higher level cache memory. The correction logic 570 may then retrieve data stored in the memory block, including the modified data portion stored in the cache line and other (correct) data portions that were initially stored in the other data storage portions of the cache line, and the correction logic 570 may subsequently write the retrieved (correct) data, including the modified data portion, back into the cache line.

For example, the cache line may have four data storage portions (15:0, 31:16, 47:32, 63:48), of which the fourth data storage portion (63:48) stores modified data. The first data storage portion 15:0 may store a data portion that is erroneous and that is causing the parity error, and therefore the output of the first OR gate 512 is 1. The corresponding output of each of the four OR gates of the block 510 is input to the OR gate 520, and is also input to the corresponding AND gate of the block 530. In this example, the fourth data storage portion stores a (correct) modified data portion, causing the AND gate 538 to output a value of 0. Hence, a first input of the AND gate 538 is 0, and a second input of the AND gate 538 is 1 to reflect a corresponding partial modification indicator within the metadata associated with the cache line. The first data storage portion is causing the parity error but is not modified, and hence the output of the AND gate 532 is 0. The portions 31:16 and 47:32 are not modified, and so the outputs of the AND gates 534, 536 are 0. Therefore, the outputs of all of the AND gates 530 are 0. Hence, all of the inputs to the OR gate 540 have a value of 0, and the output 552 of the OR gate 540 is 0. Consequently, the input (output 552) to the NAND gate 550 is 0. The second input 554 has a value of 1 reflecting a modified cache line, because data in the fourth data storage portion has been modified. The output 556 of the NAND gate 550 has a value of 1, and is input to the AND gate 560. The second input 558 of the AND gate 560 has a value of 1, indicating the detected parity error. The resultant output of the AND gate 560 has a value of 1, indicating that the parity error is correctable. The output of the AND gate 560 is input to the correction logic 570, which responds to the indication of correctable parity error by evicting the modified data portion to a memory block storing data that was initially stored in the cache line. The memory block may be located in another memory, e.g., system memory or a higher level cache. The correction logic 570 may then retrieve the data stored in the memory block including the modified data portion and other (correct) data portions initially stored in the cache line, and the correction logic 570 may write the retrieved data back into the cache line.

In cases where data has been modified in one data storage portion of a cache line of a cache memory and a parity error is due to erroneous data stored in another data storage portion, the parity error is usually correctable. Correction logic within a cache controller may receive an indication that the parity error is correctable and may correct the error in the stored data. According to an embodiment of the invention, correction may involve partially evicting data (e.g., the modified data portion) to a memory block of another memory having a memory block that stores data originally stored in the cache line, reading the stored data from the memory block, and storing the read data in the cache line. The correction can be performed by hardware, software, firmware, or combinations thereof.

It is to be noted that, to maintain cache coherency during such error correction operations, embodiments may ignore or buffer incoming snoop requests to cache lines undergoing such correction, e.g., the controller may ignore incoming snoop requests during replacement of contents of the cache line. Further, the controller may ignore self-snoop requests during replacement of the contents of the cache line.

Figure 6:
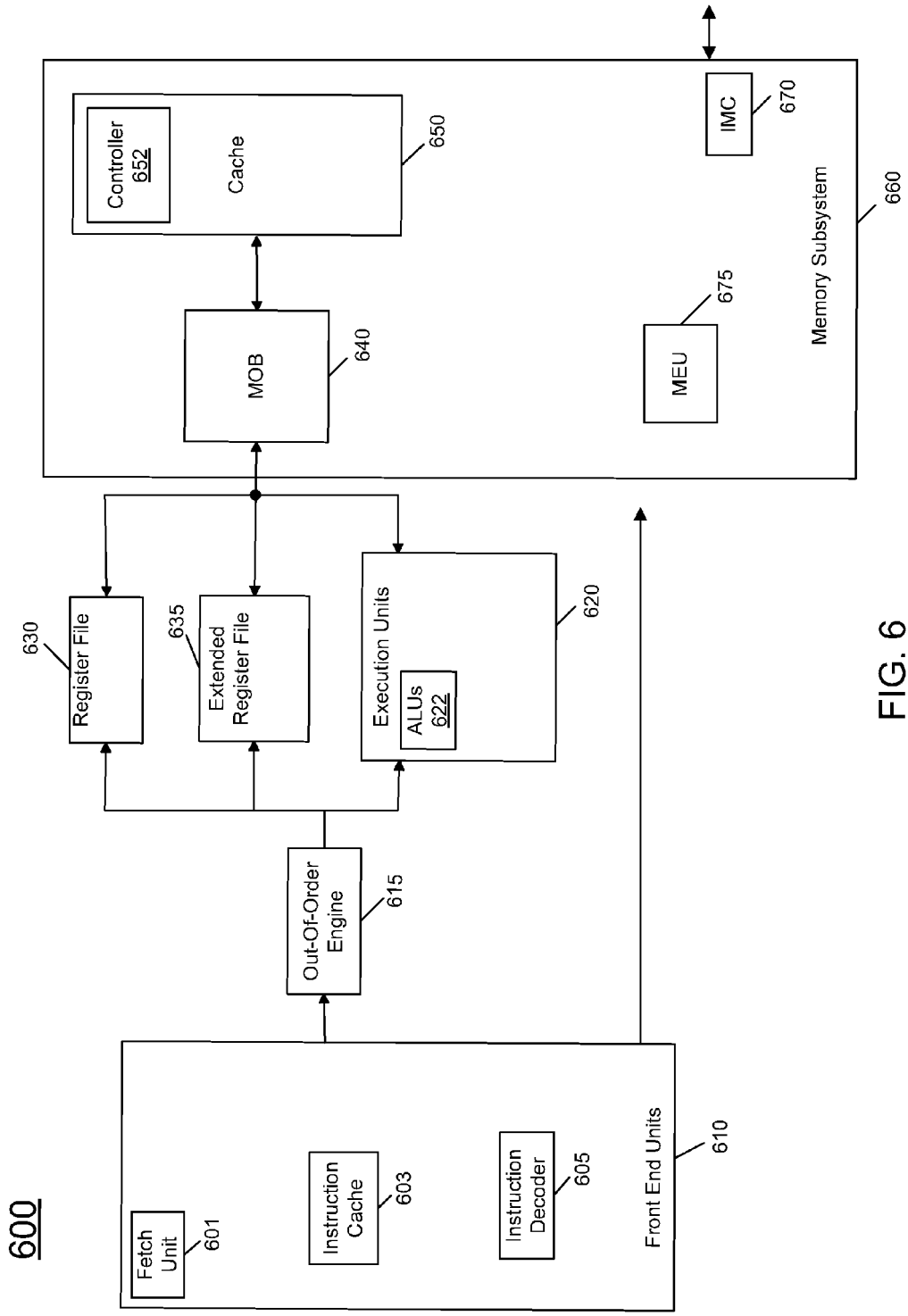
FIG. 6 is a block diagram of a processor core in accordance with one embodiment of the present invention.

Embodiments can be implemented in many different systems. For example, embodiments can be realized in a processor such as a multicore processor. Referring now to FIG. 6, shown is a block diagram of a processor core in accordance with one embodiment of the present invention. As shown in FIG. 6, processor core 600 may be one core of a multicore processor, and is shown as a multi-stage pipelined out-of-order processor. Processor core 600 is shown with a relatively simplified view in FIG. 6 to illustrate various features used in connection with data error correction in accordance with an embodiment of the present invention.

As shown in FIG. 6, core 600 includes front end units 610, which may be used to fetch instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635 such as by using renaming logic of the engine. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622. Of course other execution units such as multiply-accumulate units and so forth may further be present. Results may be provided to a retirement logic, which may be implemented within a memory subsystem 660 of the processor. Various processor structures including execution units and front end logic, for example, may be coupled to a memory subsystem 660. This memory subsystem may provide an interface between processor structures and further portions of a memory hierarchy, e.g., an on or off-chip cache and a system memory. As seen the subsystem has various components including a memory order buffer (MOB) 640. More specifically, MOB 640 may include various arrays and logic to receive information associated with instructions that are executed. This information is then examined by MOB 640 to determine whether the instructions can be validly retired and result data committed to the architectural state of the processor, or whether one or more exceptions occurred that prevent a proper retirement of the instructions. Of course, MOB 640 may handle other operations associated with retirement.

As shown in FIG. 6, MOB 640 is coupled to a cache 650 which, in one embodiment may be a low level cache (e.g., an L1 cache). The cache 650 may include a cache controller 652 that may include portion modification logic, error detection logic, and error correction logic, as described with respect to FIG. 1. Memory subsystem 660 also may include an integrated memory controller 670 to provide for communication with a system memory (not shown for ease of illustration in FIG. 6). Memory subsystem 660 may further include a memory execution unit (MEU) 675 that handles various operations to initiate memory requests and handle return of data from memory. Further, while not shown understand that other structures such as buffers, schedulers and so forth may be present in the MEU 675.

From memory subsystem 660, data communication may occur with higher level caches, system memory and so forth. While shown with this high level in the embodiment of FIG. 6, understand the scope of the present invention is not limited in this regard. For example, while the implementation of FIG. 6 is with regard to an out-of-order machine such as of a so-called x86 instruction set architecture (ISA) architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 7:
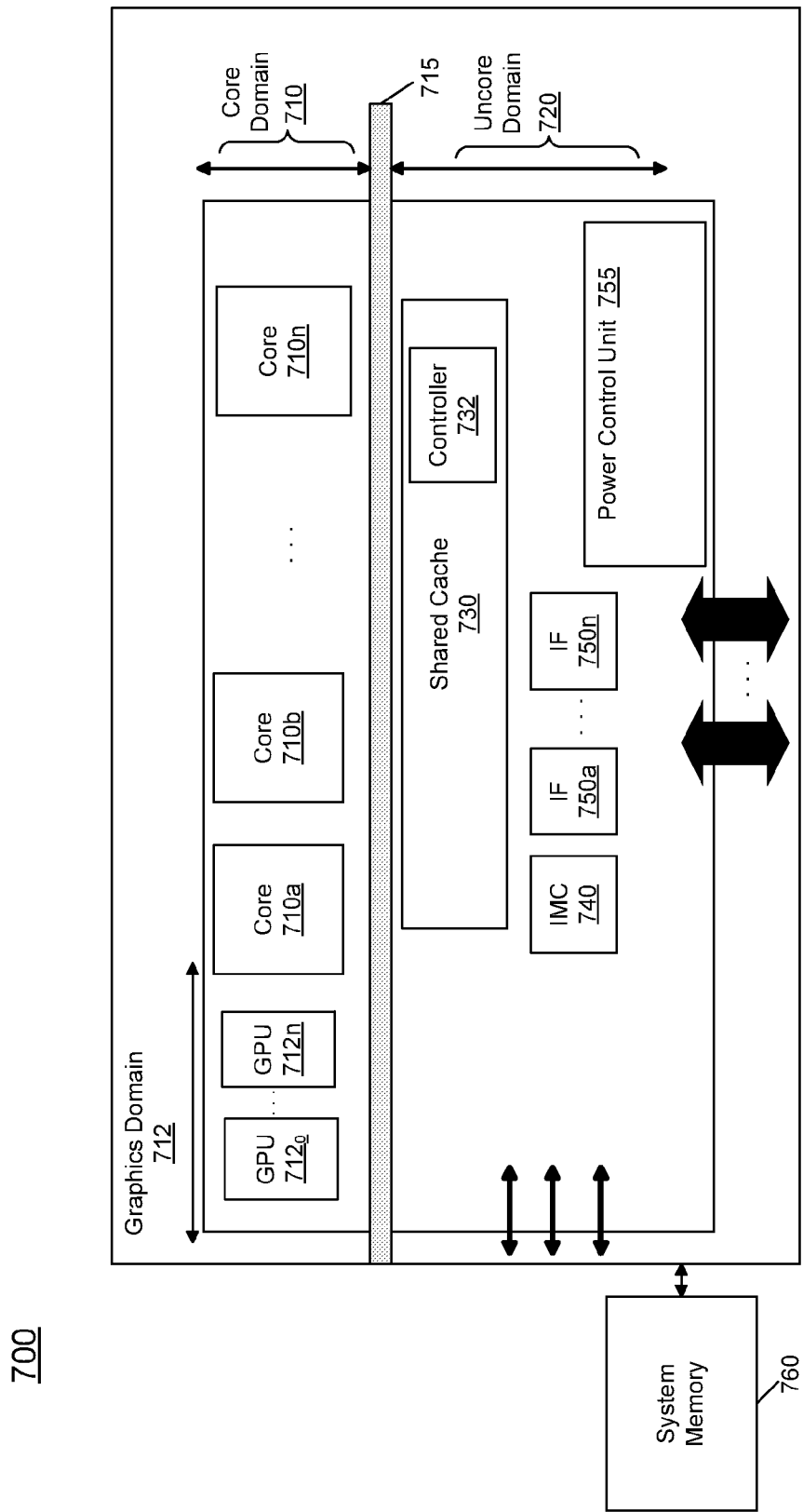
FIG. 7 is a block diagram of a processor in accordance with an embodiment of the present invention.

Referring now to FIG. 7, shown is a block diagram of a processor in accordance with an embodiment of the present invention. As shown in FIG. 7, processor 700 may be a multicore processor including a plurality of cores $710_a$-$710_n$ in a core domain 710. In one embodiment, each such core may be of an independent power domain and can be configured to operate at an independent voltage and/or frequency, and to enter turbo mode when available headroom exists, or the cores can be uniformly controlled as a single domain. In addition each core may include a memory execution unit having portion modification logic, error detection logic, and error correction logic, as described herein. As further shown in FIG. 7, one or more graphics processing units (GPUs) $712_0$-$712_n$ may be present in a graphics domain 712. Each of these independent graphics engines also may be configured to operate at independent voltage and/or frequency or may be controlled together as a single domain. These various compute elements may be coupled via an interconnect 715 to a system agent or uncore 720 that includes various components. As seen, the uncore 720 may include a shared cache 730 which may be a last level cache. The shared cache 730 may include a cache controller 732 that may include portion modification logic, error detection logic, and error correction logic, as described with respect to FIG. 1. The shared cache 730 may include a plurality of entries, and each cache entry may include metadata that may include a portion modification indicator field, as described with respect to FIGS. 1 and 2. In addition, the uncore may include an integrated memory controller 740, various interfaces 750 and a power control unit 755 to control power consumption by the components of the processor.

With further reference to FIG. 7, processor 700 may communicate with a system memory 760, e.g., via a memory bus. In addition, by interfaces 750, connection can be made to various off-chip components such as peripheral devices, mass storage and so forth. While shown with this particular implementation in the embodiment of FIG. 7, the scope of the present invention is not limited in this regard.

Figure 8:
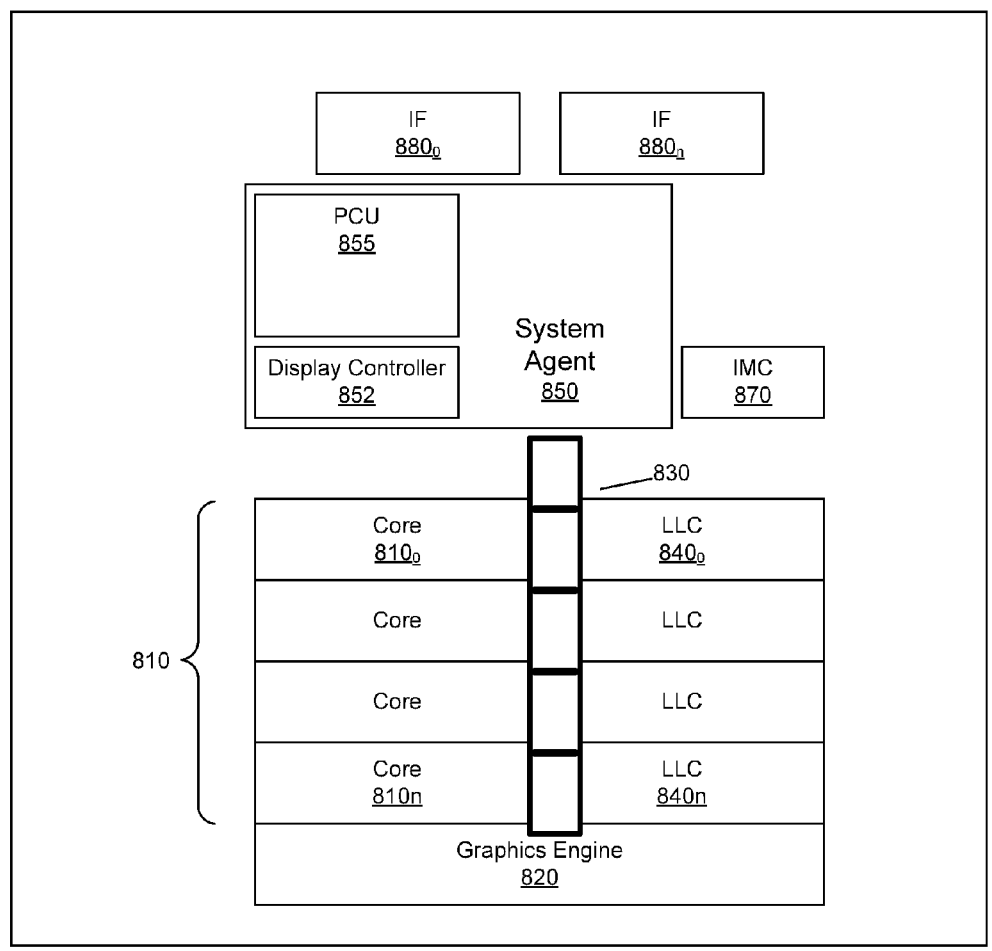
FIG. 8 is a block diagram of a multi-domain processor in accordance with another embodiment of the present invention.

Referring now to FIG. 8, shown is a block diagram of a multi-domain processor in accordance with another embodiment of the present invention. As shown in the embodiment of FIG. 8, processor 800 includes multiple domains. Specifically, a core domain 810 can include a plurality of cores $810_0$-$810_n$, a graphics domain 820 can include one or more graphics engines, and a system agent domain 850 may further be present. In various embodiments, system agent domain 850 may remain powered on at all times to handle power control events and power management such that domains 810 and 820 can be controlled to dynamically enter into and exit low power states.

Note that while only shown with three domains, understand the scope of the present invention is not limited in this regard and additional domains can be present in other embodiments. For example, multiple core domains may be present, each including at least one core.

In general, each core 810 may further include low level caches in addition to various execution units and additional processing elements. One or more of the low level caches may include a controller that may include portion modification logic, error detection logic, and error correction logic, as described with respect to FIG. 1. The low level cache may include a plurality of entries and each cache entry may include metadata that may include portion modification indicator bits, as described with respect to FIGS. 1 and 2. In turn, the various cores may be coupled to each other and to a shared cache memory formed of a plurality of units of a last level cache (LLC) $840_0$-$840_n$. In various embodiments, LLC 840 may be shared amongst the cores and the graphics engine, as well as various media processing circuitry. As seen, a ring interconnect 830 thus couples the cores together, and provides interconnection between the cores, graphics domain 820 and system agent circuitry 850.

In the embodiment of FIG. 8, system agent domain 850 may include display controller 852 which may provide control of and an interface to an associated display. As further seen, system agent domain 850 may include a power control unit 855.

As further seen in FIG. 8, processor 800 can further include an integrated memory controller (IMC) 870 that can provide for an interface to a system memory, such as a dynamic random access memory (DRAM). Multiple interfaces $880_0$-$880_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 8, understand the scope of the present invention is not limited in this regard.

Figure 9:
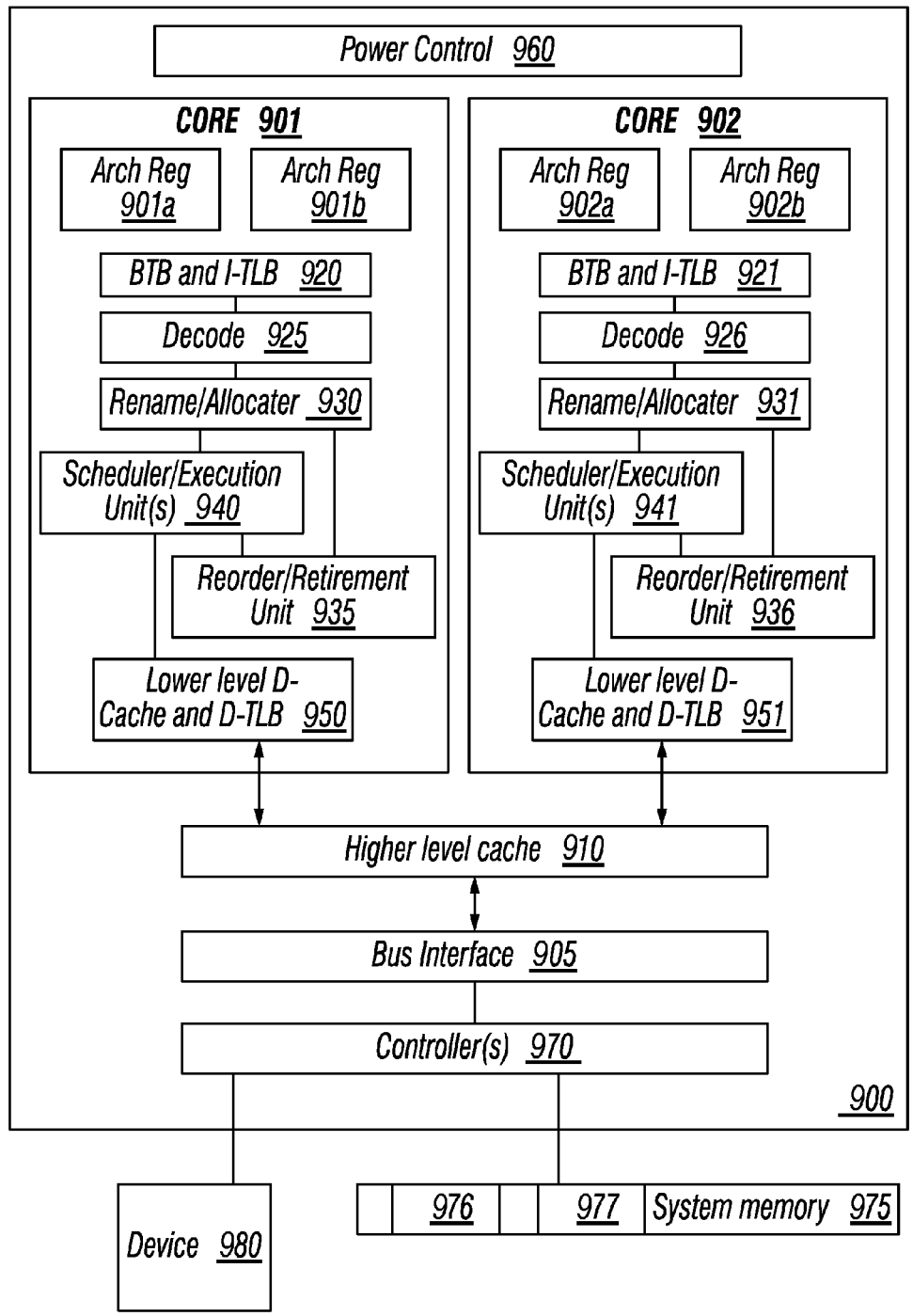
FIG. 9 is a block diagram of an embodiment of a processor including multiple cores.

Referring to FIG. 9, an embodiment of a processor including multiple cores is illustrated. Processor 900 includes any processor or processing device, such as a microprocessor, an embedded processor, a digital signal processor (DSP), a network processor, a handheld processor, an application processor, a co-processor, a system on a chip (SOC), or other device to execute code. Processor 900, in one embodiment, includes at least two cores—cores 901 and 902, which may include asymmetric cores or symmetric cores (the illustrated embodiment). However, processor 900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 900, as illustrated in FIG. 9, includes two cores, cores 901 and 902. Here, cores 901 and 902 are considered symmetric cores, i.e., cores with the same configurations, functional units, and/or logic. In another embodiment, core 901 includes an out-of-order processor core, while core 902 includes an in-order processor core. However, cores 901 and 902 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 901 are described in further detail below, as the units in core 902 operate in a similar manner.

As depicted, core 901 includes two hardware threads 901a and 901b, which may also be referred to as hardware thread slots 901a and 901b. Therefore, software entities, such as an operating system, in one embodiment potentially view processor 900 as four separate processors, i.e., four logical processors or processing elements capable of executing four software threads concurrently. As alluded to above, a first thread is associated with architecture state registers 901a, a second thread is associated with architecture state registers 901b, a third thread may be associated with architecture state registers 902a, and a fourth thread may be associated with architecture state registers 902b. Here, each of the architecture state registers (901a, 901b, 902a, and 902b) may be referred to as processing elements, thread slots, or thread units, as described above. As illustrated, architecture state registers 901a are replicated in architecture state registers 901b, so individual architecture states/contexts are capable of being stored for logical processor 901a and logical processor 901b. In core 901, other smaller resources, such as instruction pointers and renaming logic in allocator and renamer block 930 may also be replicated for threads 901a and 901b. Some resources, such as re-order buffers in reorder/retirement unit 935, ILTB 920, load/store buffers, and queues may be shared through partitioning. Other resources, such as general purpose internal registers, page-table base register(s), low-level data-cache and data-TLB 915, execution unit(s) 940, and portions of out-of-order unit 935 are potentially fully shared.

Processor 900 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 901 includes a simplified, representative out-of-order (OOO) processor core. But an in-order processor may be utilized in different embodiments. The OOO core includes a branch target buffer 920 to predict branches to be executed/taken and an instruction-translation buffer (I-TLB) 920 to store address translation entries for instructions.

Core 901 further includes decode module 925 coupled to fetch unit 920 to decode fetched elements. Fetch logic, in one embodiment, includes individual sequencers associated with thread slots 901a, 901b, respectively. Usually core 901 is associated with a first ISA, which defines/specifies instructions executable on processor 900. Often machine code instructions that are part of the first ISA include a portion of the instruction (referred to as an opcode), which references/specifies an instruction or operation to be performed. Decode logic 925 includes circuitry that recognizes these instructions from their opcodes and passes the decoded instructions on in the pipeline for processing as defined by the first ISA. For example, decoders 925, in one embodiment, include logic designed or adapted to recognize specific instructions, such as transactional instruction. As a result of the recognition by decoders 925, the architecture or core 901 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 930 includes an allocator to reserve resources, such as register files to store instruction processing results. However, threads 901a and 901b are potentially capable of out-of-order execution, where allocator and renamer block 930 also reserves other resources, such as reorder buffers to track instruction results. Unit 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The lower level cache may include a controller that may include portion modification logic, error detection logic, and error correction logic, as described with respect to FIG. 1. The lower level cache may store a plurality of entries and each entry may include metadata that may include portion modification indicator bits, as described with respect to FIGS. 1 and 2. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 901 and 902 share access to higher-level or further-out cache 910, which is to cache recently fetched elements. Note that higher-level or further-out refers to cache levels increasing or getting further away from the execution unit(s). In one embodiment, higher-level cache 910 is a last-level data cache—last cache in the memory hierarchy on processor 900—such as a second or third level data cache. However, higher level cache 910 is not so limited, as it may be associated with or includes an instruction cache. A trace cache—a type of instruction cache—instead may be coupled after decoder 925 to store recently decoded traces.

In the depicted configuration, processor 900 also includes bus interface module 905 and a power controller 960, which may perform power sharing control in accordance with an embodiment of the present invention. Historically, controller 970 has been included in a computing system external to processor 900. In this scenario, bus interface 905 is to communicate with devices external to processor 900, such as system memory 975, a chipset (often including a memory controller hub to connect to memory 975 and an I/O controller hub to connect peripheral devices), a memory controller hub, a northbridge, or other integrated circuit. And in this scenario, bus 905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 970 is illustrated as part of processor 900. Recently, as more logic and devices are being integrated on a single die, such as SOC, each of these devices may be incorporated on processor 900. For example in one embodiment, memory controller hub 970 is on the same package and/or die with processor 900. Here, a portion of the core (an on-core portion) includes one or more controller(s) 970 for interfacing with other devices such as memory 975 or a graphics device 980. The configuration including an interconnect and controllers for interfacing with such devices is often referred to as an on-core (or un-core configuration). As an example, bus interface 905 includes a ring interconnect with a memory controller for interfacing with memory 975 and a graphics controller for interfacing with graphics processor 980. Yet, in the SOC environment, even more devices, such as the network interface, co-processors, memory 975, graphics processor 980, and any other known computer devices/interface may be integrated on a single die or integrated circuit to provide small form factor with high functionality and low power consumption.

Figure 10:
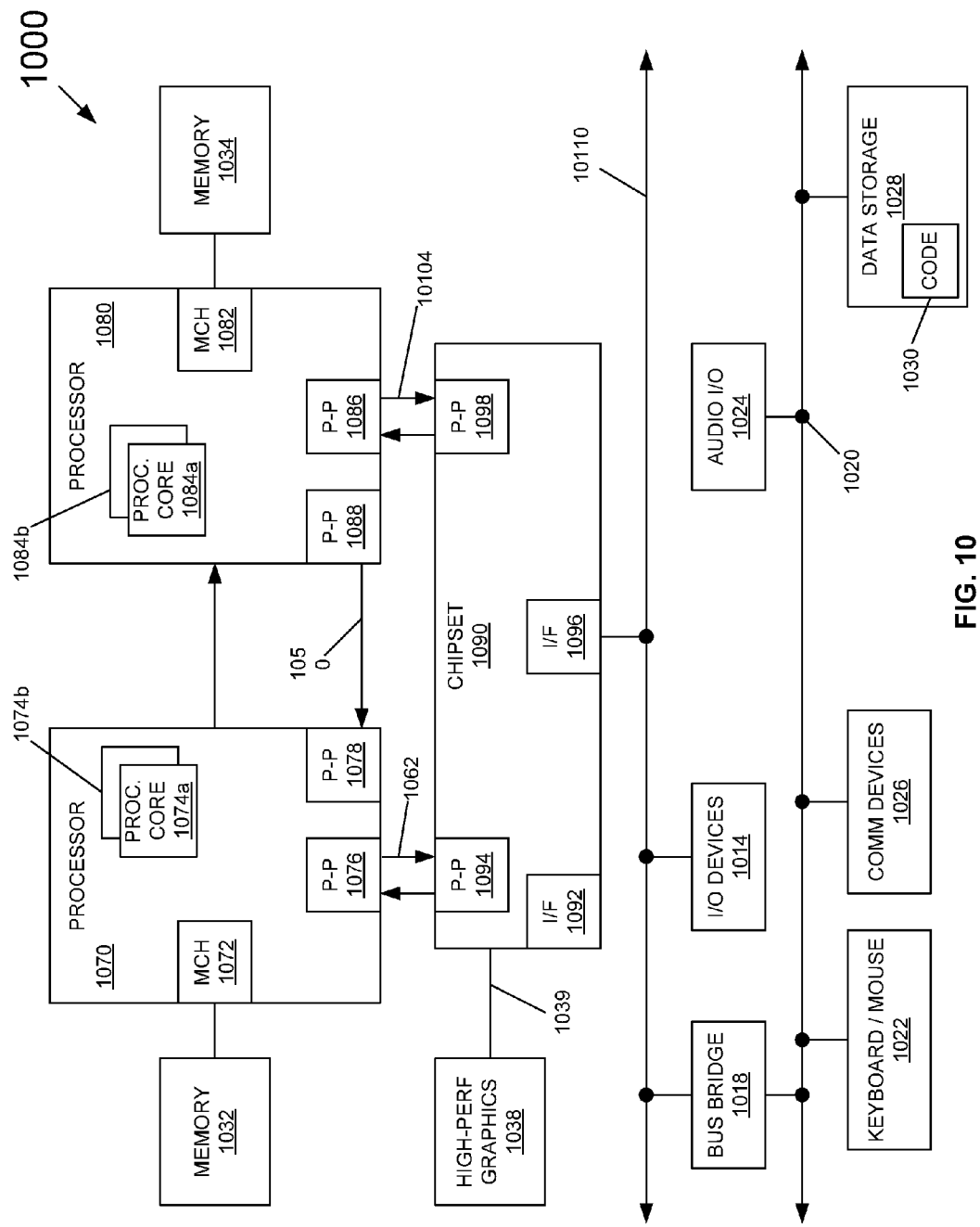
FIG. 10 is a block diagram of a system in accordance with an embodiment of the present invention.

Embodiments may be implemented in many different system types. Referring now to FIG. 10, shown is a block diagram of a system in accordance with an embodiment of the present invention. As shown in FIG. 10, multiprocessor system 1000 is a point-to-point interconnect system, and includes a first processor 1070 and a second processor 1080 coupled via a point-to-point interconnect 1050. As shown in FIG. 10, each of processors 1070 and 1080 may be multicore processors, including first and second processor cores (i.e., processor cores 1074a and 1074b and processor cores 1084a and 1084b), although potentially many more cores may be present in the processors. Each of the processors may include a respective cache. One or more of the caches may include a controller that may include portion modification logic, error detection logic, and error correction logic, as described with respect to FIG. 1. One or more of the caches may store a plurality of entries and each entry may include metadata that may include portion modification indicator bits, as described with respect to FIGS. 1 and 2.

Still referring to FIG. 10, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 10, MCH's 1072 and 1082 couple the processors to respective memories, namely a memory 1032 and a memory 1034, which may be portions of system memory (e.g., DRAM) locally attached to the respective processors. First processor 1070 and second processor 1080 may be coupled to a chipset 1090 via P-P interconnects 1052 and 1054, respectively. As shown in FIG. 10, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 10, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 1024 may be coupled to second bus 1020. Embodiments can be incorporated into other types of systems including mobile devices such as a smart cellular telephone, Ultrabook™, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a core to execute instructions; and
   a cache memory coupled to the core and having a plurality of entries, each entry including:
      a data storage including a plurality of data storage portions, each data storage portion to store a corresponding data portion; and
      a metadata storage to store a plurality of portion modification indicators each corresponding to one of the data storage portions and to indicate whether the data portion stored in the corresponding data storage portion has been modified.

2. The processor of claim 1, wherein the metadata storage is to store a cache coherency status indicator to indicate a cache coherency status of a corresponding data storage of the entry, wherein each cache coherency status comprises one of modified, exclusive, shared, and invalid.

3. The processor of claim 1, wherein the metadata storage further comprises parity storage to store parity information to indicate, for each data portion stored in the entry, whether the data portion is correct or erroneous.

4. The processor of claim 1, wherein the processor includes portion modification logic to indicate, based on at least one of the portion modification indicators stored in a first entry of the cache memory, whether a first data portion stored in the corresponding data storage portion has been modified.

5. The processor of claim 1, wherein the processor includes detection logic to indicate, based on the portion modification indicators stored in a first entry of the cache memory and upon parity information associated with the first entry, whether an error in the first entry of the cache memory is correctable.

6. The processor of claim 5, wherein the processor includes correction logic that, in response to an indication that the error is correctable, is to correct the error by:
   eviction of a modified data portion of the first entry to a memory block of another memory to replace a corresponding data portion in the memory block that includes data initially stored in the first entry; and
   after replacement of the corresponding data portion in the memory block by the modified data portion, storage of contents of the memory block in the first entry.

7. A processor comprising:
   a core to execute instructions;
   a cache memory coupled to the core; and
   a cache controller comprising:
      modification detection logic to detect, for each data storage portion of a plurality of data storage portions of a cache line of the cache memory, whether the data storage portion stores a respective modified data portion; and
      error detection logic to determine, for each data storage portion, whether the data storage portion stores correct data or erroneous data.

8. The processor of claim 7, wherein the cache controller further comprises error correction logic responsive to an indication from the modification detection logic that the first data storage portion stores a first modified data portion and to an indication from the error detection logic that the first data storage portion stores correct data and that at least one of the other data storage portions of the cache line stores erroneous data, to correct the erroneous data.

9. The processor of claim 8, wherein the error correction logic is to write the first modified data portion into a first data storage portion of a memory coupled to the cache memory to form an updated data block including the first modified data portion and contents of another of the data storage portions.

10. The processor of claim 9, wherein the error correction logic is to write the first modified data portion into the first data storage portion of the memory by overwriting a previously stored data portion at the first data storage portion of the memory.

11. The processor of claim 9, wherein the cache controller is to read the updated data block from the memory and store the updated data block into the cache line of the cache memory.

12. The processor of claim 8, wherein the error correction logic, responsive to an indication that a first data storage portion of the plurality of data storage portions stores a first modified data portion and to an indication from the error detection logic that the first data storage portion stores erroneous data, is to raise a machine check error.

13. A system comprising:
   a multicore processor including:
      a cache memory including a cache line that includes a plurality of data storage portions; and
      a controller to:
         store, in the cache line, a plurality of data portions including a first data portion, wherein each data portion is to be stored in a corresponding data storage portion of the cache line;
         replace the first data portion stored in the first data storage portion by a modified first data portion;
         after replacement of the first data portion by the modified first data portion, determine whether the cache line includes erroneous data, and determine whether the modified first data portion stored at the first data storage portion is correct, and if so, to correct the erroneous data; and
   a dynamic random access memory (DRAM) coupled to the multicore processor.

14. The system of claim 13, wherein responsive to an indication that the modified first data portion is correct, the controller is further to partially evict the modified first data portion to a data block of a memory coupled to the cache memory to form an updated data block in the memory.

15. The system of claim 14, wherein the controller is further to replace contents of the cache line within the cache memory by contents of the updated data block.

16. The system of claim 15, wherein the controller is to ignore self-snoop requests during replacement of the contents of the cache line.

17. The system of claim 15, wherein the controller is to handle a snoop request received from another device during replacement of the contents of the cache line by ignoring or buffering the snoop request.

18. The system of claim 13, wherein responsive to an indication that the modified first data portion includes erroneous data, the controller is further to raise a machine check error.

19. A method comprising:
    modifying a first data portion stored in a first data storage portion of a cache line that comprises a plurality of data storage portions, wherein each data storage portion is associated with a corresponding portion modification indicator; and
    responsive to modifying the first data portion stored in the first data storage portion, updating a first portion modification indicator associated with the first data storage portion to indicate the first data storage portion as modified while maintaining respective values of each other portion modification indicator.

20. The method of claim 19, further comprising detecting an error associated with the cache line and identifying a second data storage portion causing the error.

21. The method of claim 20, wherein in response to determining that the error is not present in the first data storage portion, correcting data stored in the second data storage portion causing the error.

22. The method of claim 21, wherein correcting the data stored in the second data storage portion comprises:
    partially evicting the modified first data portion to a data block of a memory coupled to the cache memory to form an updated data block in the memory; and
    replacing contents of the cache line within the cache memory by contents of the updated data block.

23. The method of claim 22, wherein the updated data block includes other data that has been stored in the cache line and that is correct.

24. The method of claim 20, further comprising in response to determining that the error is caused by the first data storage portion, raising a machine check error.

* * * * *